United States Patent
West et al.

(10) Patent No.: US 11,685,453 B2
(45) Date of Patent: Jun. 27, 2023

(54) TRACK TENSION MANAGEMENT SYSTEM AND METHOD

(71) Applicant: DEERE & COMPANY, Moline, IL (US)

(72) Inventors: Sean P. West, Waterloo, IA (US); Brian E. Biles, Waterloo, IA (US); Benjamin J. Heimbuch, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 103 days.

(21) Appl. No.: 17/182,532

(22) Filed: Feb. 23, 2021

(65) Prior Publication Data

US 2021/0362791 A1 Nov. 25, 2021

Related U.S. Application Data (60) Provisional application No. 63/028,668, filed on May 22, 2020.

(51) Int. Cl.
| | |
|---|---|
| *B62D 55/30* | (2006.01) |
| *B62D 55/065* | (2006.01) |
| *B62D 55/104* | (2006.01) |
| *B62D 55/14* | (2006.01) |
| *B62D 55/24* | (2006.01) |

(52) U.S. Cl.
CPC ........... *B62D 55/30* (2013.01); *B62D 55/065* (2013.01); *B62D 55/14* (2013.01); *B62D 55/24* (2013.01)

(58) Field of Classification Search
CPC .... B62D 55/065; B62D 55/30; B62D 55/305; B62D 55/14; B62D 55/24; B62D 55/116; B62D 55/104

USPC .......................................................... 305/144
See application file for complete search history.

(56) References Cited

U.S. PATENT DOCUMENTS

| | | | | |
|---|---|---|---|---|
| 4,840,437 A | * | 6/1989 | Henry ................. | B62D 55/305 305/144 |
| 5,372,212 A | * | 12/1994 | Davis .................... | B62D 55/30 180/9.1 |
| 6,276,768 B1 | | 8/2001 | Miller | |

(Continued)

FOREIGN PATENT DOCUMENTS

| | | |
|---|---|---|
| DE | 102017002163 A1 | 9/2018 |
| DE | 102020210157 A1 | 4/2021 |

(Continued)

OTHER PUBLICATIONS

German Search Report issued in application No. DE102021204021.7, dated Dec. 22, 2021, 9 pages.

*Primary Examiner* — Anne Marie M Boehler
(74) *Attorney, Agent, or Firm* — Taft Stettinius & Hollister LLP; Stephen F. Rost (57) ABSTRACT

A work machine may include an electric motor, an idler wheel, a drivable track engaged with the idler wheel, and an actuator that is electrically powered by the electric motor and configured to move the idler wheel to adjust the tension in the drivable track based on the torque output of the electric motor. The work machine also includes a controller configured to automatically control the electrical current input to the electric motor based on one or more monitored control factors associated with the work machine.

22 Claims, 4 Drawing Sheets

(56) References Cited

U.S. PATENT DOCUMENTS

| | | | |
|---|---|---|---|
| 6,354,678 B1* | 3/2002 | Oertley | B62D 55/30 |
| | | | 305/144 |
| 6,432,010 B1* | 8/2002 | Palonis | B62D 55/305 |
| | | | 305/144 |
| 8,985,250 B1* | 3/2015 | Lussier | B60W 30/18172 |
| | | | 180/9.1 |
| 2005/0029866 A1* | 2/2005 | Tamaru | B62D 55/305 |
| | | | 305/125 |
| 2011/0309673 A1* | 12/2011 | Vigren | B62D 55/32 |
| | | | 305/145 |
| 2017/0001672 A1* | 1/2017 | Bodin | B62D 55/116 |
| 2020/0114992 A1* | 4/2020 | Edelin | B62D 55/305 |
| 2020/0156720 A1* | 5/2020 | Dybro | B62D 55/084 |
| 2021/0016848 A1 | 1/2021 | Johnson et al. | |
| 2021/0101653 A1 | 4/2021 | West et al. | |
| 2021/0253185 A1* | 8/2021 | Sauvageau | B62D 55/116 |
| 2022/0049726 A1* | 2/2022 | Smith | F15B 1/04 |

FOREIGN PATENT DOCUMENTS

| | | |
|---|---|---|
| FR | 2484352 A1 | 12/1981 |
| JP | H10250646 A | 9/1998 |

\* cited by examiner

TRACK TENSION MANAGEMENT SYSTEM AND METHOD

RELATED APPLICATIONS

This application claims priority to U.S. Provisional Application Ser. No. 63/028,668, filed May 22, 2020, the disclosure of which is hereby incorporated by reference in its entirety.

FIELD OF THE DISCLOSURE

The present disclosure relates to machinery with a drive assembly, and more particularly to an actuator for use with a drivable track of the drive assembly.

BACKGROUND

Many work machines, and in particular agricultural work machines, have continuous drivable tracks for propelling the work machine. Each drivable track may be in tension. The tension on the drivable track may be adjusted based on different operating conditions of the work machine or external factors affecting the work machine. The tension adjustment is generally a manual adjustment, often performed when the machine is idle, by an operator or other user.

What is needed therefore is a system and method for identifying factors that may have an adverse effect on the drivable track if not otherwise addressed. What is also needed is a system and method for automatically adjusting the tension on the drivable track in response to the identified factors. What is also needed is a system and method capable of actively estimating and adjusting the tension on an elastomeric drivable track in an efficient manner based on the identified factors. To achieve the desired efficiency, it may be advantageous to adjust the tension on the drivable track using an electrically powered linear actuator rather than a hydraulically powered cylinder.

SUMMARY

In an illustrative embodiment, a work machine comprises: a drive assembly including: an electric motor; an idler wheel; a drivable track engaged with the idler wheel; and a linear actuator driven by the electric motor, coupled to the idler wheel, and movable through a range of positions, wherein each position of the linear actuator is associated with a different tension of the drivable track; and a controller configured to determine a torque output of the electric motor and configured to determine the actual tension of the drivable track based on the torque output of the electric motor. In some embodiments, the drivable track is an elastomeric material.

In some embodiments, the work machine further comprises an engine mechanically coupled to the drivable track and configured to drive rotation of the drivable track; wherein the controller is configured to send signals to the electric motor to move the linear actuator based on a torque output of the engine. In some embodiments, the controller is configured to send signals to the electric motor to move the linear actuator based on a speed of travel of the work machine. In some embodiments, the controller is configured to send signals to the electric motor to move the linear actuator based on a rate of change of the speed of travel of the work machine.

In some embodiments, the controller is configured to send signals to the electric motor to extend or fix the position of the linear actuator when a rate of reduction in speed exceeds a threshold rate of reduction in speed of the work machine.

In some embodiments, the work machine further comprises a brake pedal movable through a range of positions including a fully raised position and a fully depressed position; and the controller is configured to send a signal to the electric motor to move the linear actuator based on a position of the brake pedal. In some embodiments, the controller is configured to monitor a rate of position change of the brake pedal; and the controller commands the electric motor to move the linear actuator if the rate of position change of the brake pedal exceeds a threshold rate of position change.

In some embodiments, the controller is configured to send signals to the electric motor to move the linear actuator based on a change in a direction of travel of the work machine.

In some embodiments, the controller is configured to receive a signal associated with a target tension of the drivable track; and the controller commands the electric motor to move the linear actuator if the actual tension is beyond a threshold difference from the target tension.

In some embodiments, the controller is configured to send signals to the electric motor to retract the linear actuator and subsequently extend the linear actuator to a position associated with the target tension. In some embodiments, the controller is configured to retract the linear actuator and subsequently extend the linear actuator to a position associated with the target tension in response to a change in a direction of travel of the work machine.

In another illustrative embodiment, a work machine comprises: an electric motor configured to receive electrical current and output mechanical power through rotation of an output shaft; an idler wheel; an elastomeric drivable track engaged with the idler wheel; an engine configured to drive rotation of the drivable track; a compressible brake pedal configured to cease or slow rotation of the elastomeric drivable track when compressed; and a linear actuator powered by the electric motor, coupled to the idler wheel, and movable through a range of positions, wherein each position of the linear actuator is associated with a different tension of the elastomeric drivable track; and a controller configured to automatically control: (a) the electrical current input to the electric motor and (b) the direction of rotation of the output shaft, to cause movement of the linear actuator corresponding to the electrical current input to the electric motor and the direction of rotation of the output shaft, to adjust an actual tension of the elastomeric drivable track based on one or more monitored control factors associated with the work machine.

In some embodiments, the monitored control factors include at least one of: a torque output of the engine, a rate of change of the torque output of the engine, a speed of the work machine, a rate of change of the speed of the work machine, a position of the compressible brake pedal, a rate of change of brake pedal position, a direction of travel of the work machine, a change in the direction of travel of the work machine, and a target tension of the elastomeric drivable track associated with an amount of electrical current to be input to the electrical motor.

In some embodiments, the controller is configured to compare the actual tension of the elastomeric drivable track to the target tension of the elastomeric drivable track; and the controller is configured to automatically adjust at least one of: (a) the electrical current input to the electric motor and (b) the direction of rotation of an output shaft of the electric motor, if the actual tension is beyond a threshold difference from the target tension.

In another illustrative embodiment, a method of operating a work machine having an elastomeric drivable track comprises: monitoring at least one control factor associated with the work machine including: a torque output of an engine of the work machine, a rate of change of the torque output of the engine, a speed of the work machine, a rate of change of the speed of the work machine, a position of a brake pedal of the work machine, a rate of change the position of the brake pedal, a direction of travel of the work machine, a change in the direction of travel of the work machine, and a target tension of the elastomeric drivable track. The method further includes adjusting an actual tension of the elastomeric drivable track based on the at least one monitored control factor associated with the work machine.

In some embodiments, adjusting an actual tension of the elastomeric drivable track includes: adjusting electrical signals input to an electric motor to move a linear actuator coupled to an idler wheel that is engaged with the elastomeric drivable track.

In some embodiments, the method further comprises: determining the actual tension of the elastomeric drivable track based on the electrical power input to the electric motor; determining the target tension of the elastomeric drivable track; and comparing the actual tension of the elastomeric drivable track to the target tension of the elastomeric drivable track; and adjusting the electrical signals input to the electric motor includes reversing the direction of rotation of an output shaft of the electric motor.

In some embodiments, the elastomeric drivable track is one of a plurality of elastomeric drivable tracks of the work machine, the electric motor is one of a plurality of electric motors of the work machine; the linear actuator is one of a plurality of linear actuators of the work machine; the idler wheel is one of a plurality of idler wheels of the work machine, each idler wheel of the plurality of idler wheels is engaged with a corresponding elastomeric drivable track of the plurality of elastomeric drivable tracks; and the method further comprises: adjusting electrical signals input to at least one electric motor of the plurality of electric motors independently of electrical signals input to the remaining electric motors of the plurality of electric motors, based on the at least one monitored control factor associated with the work machine.

In some embodiments, the elastomeric drivable track is one of a plurality of elastomeric drivable tracks of the work machine, the electric motor is one of a plurality of electric motors of the work machine; the linear actuator is one of a plurality of linear actuators of the work machine; the idler wheel is one of a plurality of idler wheels of the work machine, each idler wheel of the plurality of idler wheels is engaged with a corresponding elastomeric drivable track of the plurality of elastomeric drivable tracks; and wherein the plurality of elastomeric drivable tracks includes a forward pair of elastomeric drivable tracks and a rear pair of elastomeric drivable tracks; and wherein the method further comprises: adjusting an actual tension one of the forward pair of elastomeric drivable tracks and the rearward pair of elastomeric drivable tracks independently of the other of the forward pair of elastomeric drivable tracks and the rearward pair of elastomeric drivable tracks, based on the at least one monitored control factor associated with the work machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
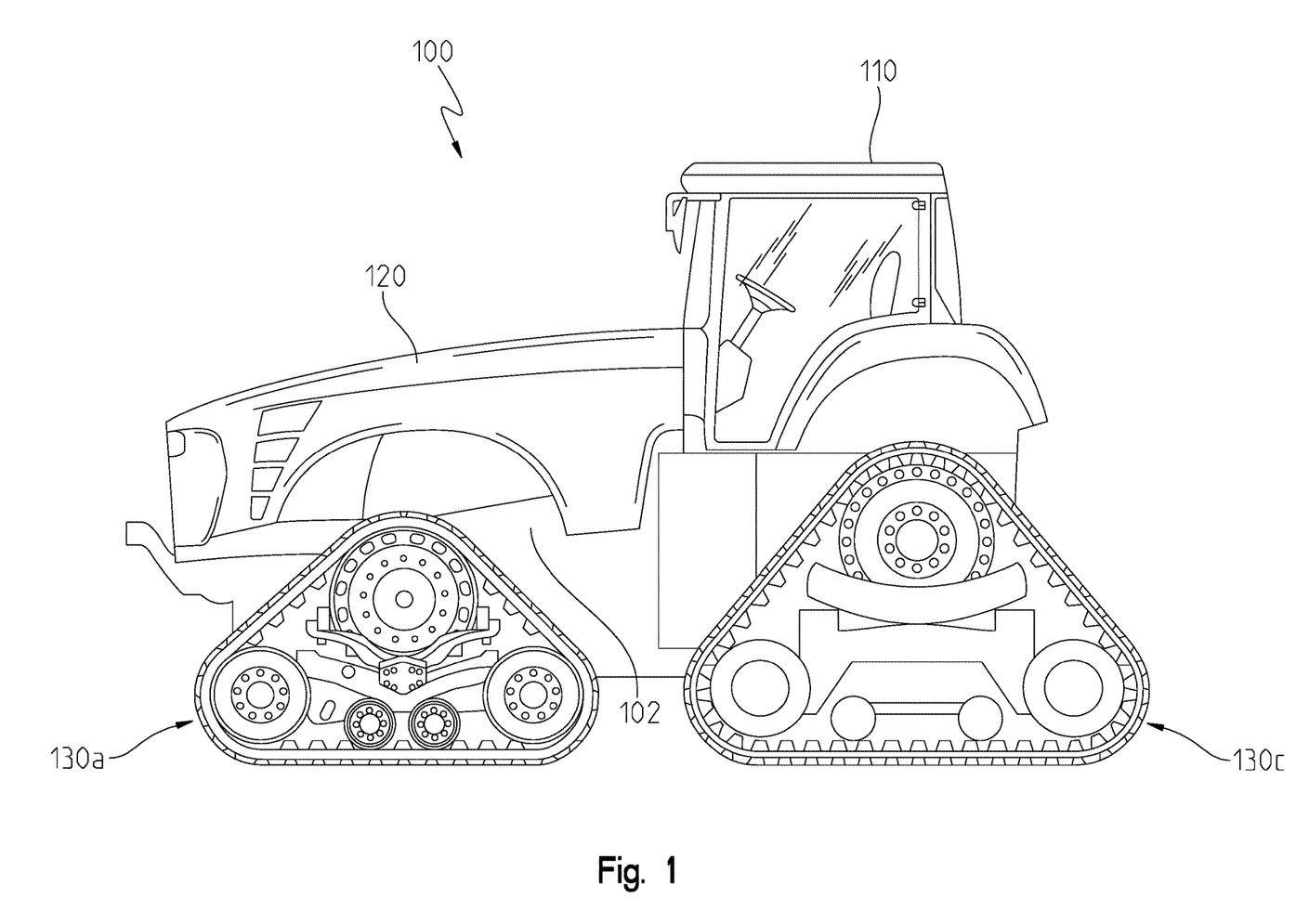
FIG. 1 illustrates a side view of a work machine with drivable tracks.

FIG. 1 illustrates an exemplary work machine 100, in this example a tractor, including a tractor frame 102, an operator cab 110, an engine compartment that holds an engine 120, front drive assemblies 130a, 130b and rear drive assemblies 130c, 130d. The drive assemblies 130a-d may be referred to as undercarriages. FIG. 1 shows only the left side of the work machine 100 with the front drive assembly 130a and the rear drive assembly 130c; however, the right side of the vehicle 100 also includes the front drive assembly 130b and the rear drive assembly 130d. It should be appreciated that reference numbers having a common base number (for example 130a-d) are positioned in different locations on the work machine but function substantially the same in regard to their role in the system and method of track tension management, as will be described in greater detail below. It should also be appreciated that any description of a base number alone applies to each component that includes base number in its reference number.

The tractor frame 102 supports the operator cab 110 and engine 120. The drive assemblies 130a-d support the tractor frame 102 above the ground, and provide propelling force to the vehicle 100. The operator cab 110 provides the operator with a clear view of the area being worked by the vehicle 100. The operator cab 110 includes controls for the operator to control the engine 120 and other components of the work machine 100.

Figure 2:
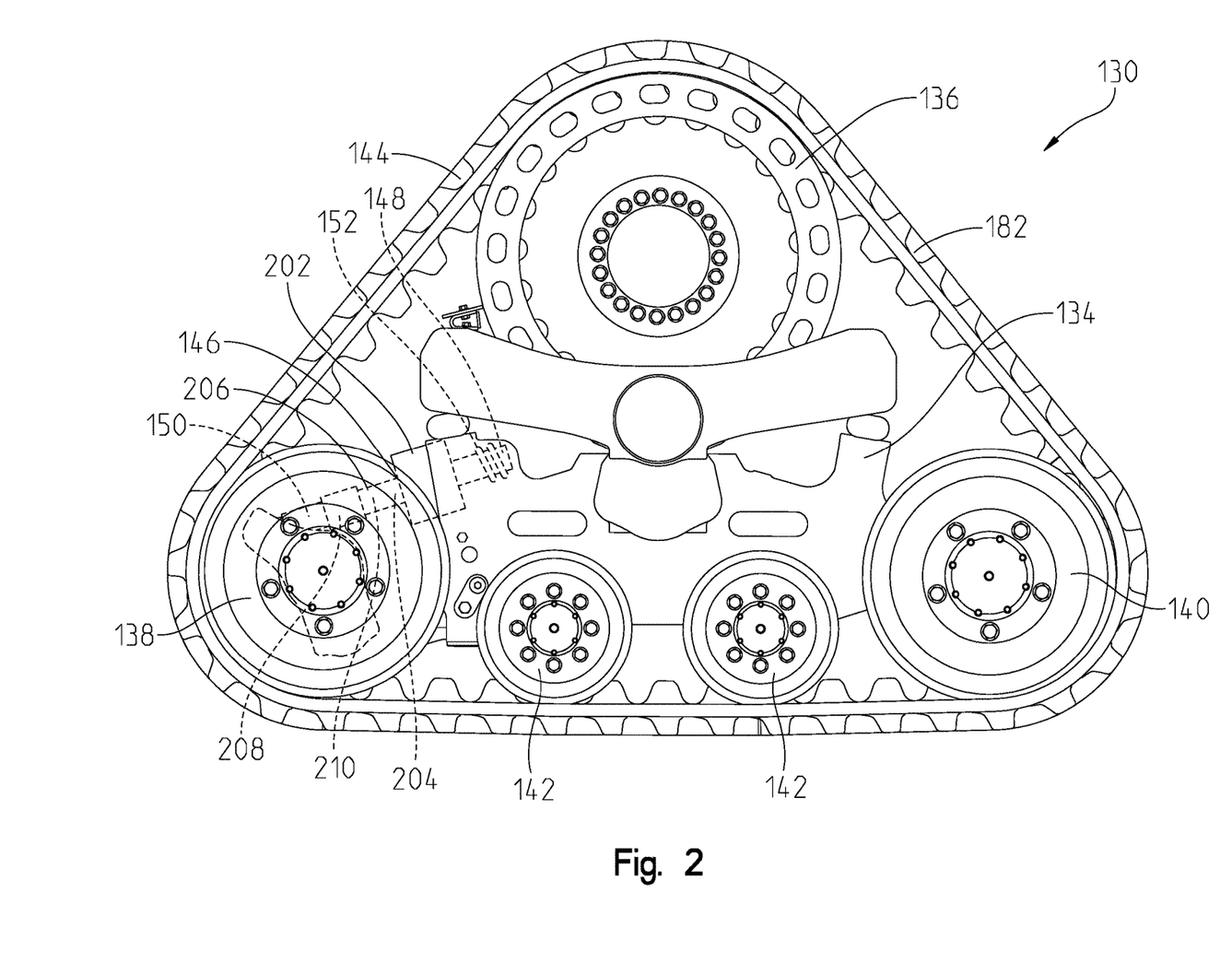
FIG. 2 illustrates a side view of a drive assembly of the work machine including an electrically powered linear actuator shown partially in phantom.

FIG. 2 illustrates a side view of a drive assembly 130. The drive assembly 130 includes a drive frame 134, a drive sprocket 136, a front idler wheel 138, a rear idler wheel 140, mid rollers 142, and a drivable track 144. The drivable track 144 may be referred to as a belt. While two mid rollers 142 are illustrated in the example shown in FIG. 2, this disclosure applies to drive assemblies having any number of mid rollers 142 and any arrangement of components within the drive assembly 130. Further, the disclosure applies to any work machine 100 with adjustable, tensioned drivable tracks. The drivable track 144 illustratively shown in FIGS.

1-2 is an elastomeric drivable track 144, which introduces different tension-related considerations from drivable tracks made of predominantly steel (i.e. grousers). The elastomeric track 144 is, for example, a composite material comprising rubber or rubber-like compounds, steel or other metallic cables, and fabric or fabric-like reinforcements.

Referring still to FIG. 2, in the illustrative embodiment, the rear idler wheel 140 is positioned rearwardly of the front idler wheel 138, and the drive sprocket 136 is positioned above the idler wheels 138, 140. The idler wheels 138, 140, the mid rollers 142, and the drive sprocket 136 are coupled to the drive frame 134. Each of the idler wheels 138, 140, the mid rollers 142, and the drive sprocket 136 may engage the drivable track 144 to define a geometry of the drivable track 144. The drive sprocket 136 is rotatable relative to the drive frame 134 to drive rotation of the drivable track 144 about the drive frame 134 and the components coupled thereto.

As shown in FIG. 2, an actuator 146 is coupled at a first end 148 to the drive frame 134 and a second end 150 to the front idler wheel 138. In some instances, the actuator 146 may be referred to as a tension cylinder, a linear actuator, or an electrically powered actuator. A spring 152 may be positioned at the first end 148 of the actuator 146. The spring 152 is coupled at its first end to the actuator 146 and at its second end to the drive frame 134 to absorb impact associated with relatively minor changes in the geometry of the drivable track 144 during operation of the work machine 100.

The second end 150 of the actuator 146 is movable through a range of positions relative to the drive frame 134, the drive sprocket 136, and the rear idler wheel 140. The range of positions of the actuator 146 includes a fully extended position and a fully retracted position. Similarly, the actuator 146 moves the front idler wheel 138 through a range of positions including a fully extended position and a fully retracted position of the front idler wheel 138. As the front idler wheel 138 is moved toward its fully extended position, the tension on the drivable track 144 increases. As the front idler wheel 138 is moved toward its fully retracted position, the tension on the drivable track 144 decreases. Thus, it should be appreciated that each position of the front idler wheel 138 is associated with a different tension of the drivable track 144.

Although FIG. 2 shows the actuator 146 coupled to the front idler wheel 138, it should be appreciated that an actuator may be coupled to the rear idler wheel 140 or any other component of the drive assembly 130 engaged with the drivable track 144. Such an actuator may move the component engaged with the drivable track 144 to adjust the tension of the drivable track 144. The description of the track tension system and method herein may be applied equally to any such electrically powered actuator suitable for use with the other components described herein.

As shown in FIG. 2, the actuator 146 includes an electric motor 202 configured to receive electrical energy and output mechanical energy. For example, the electric motor 202 receives electrical current and outputs mechanical energy (in the form of rotation) in an amount corresponding to the electrical current input to the electric motor 202. The electric motor 202 includes a motor output shaft 204 rotatably drivable by the electric motor 202. The motor output shaft 204 may be driven clockwise or counter-clockwise and with varying amounts of torque and/or speed depending on electrical signals received from a controller 180, as will be described in greater detail below.

The motor output shaft 204 is coupled to a planetary screw drive 206. The planetary screw drive 206 may include a planetary gear system having a rotary output mechanically coupled to a rotary-to-linear motion conversion device, such as a ball screw. Thus, the planetary screw drive 206 is configured to convert rotation of the motor output shaft 204 to linear movement of the actuator 146 along a central axis of the actuator 146. A first direction of rotation of the motor output shaft 204 is associated with extension of the linear actuator 146, and a second direction of rotation of the motor output shaft 204 is associated with retraction of the linear actuator 146.

In the illustrative embodiment shown in FIG. 2, the planetary screw drive 206 includes a translating nut 208 and a threaded shaft spindle 210 along which the translating nut 208 moves. The electric motor 202 rotates the motor output shaft 204 to rotate the threaded spindle 210 and drive linear movement of the translating nut 208. The translating nut 208 is fixedly coupled to the second end 150 of the linear actuator 146, and therefore, the second end 150 of the linear actuator 146 moves axially in conjunction with the translating nut 208 along the central axis of the linear actuator 146. Linear movement of the second end 150 of actuator 146 moves the idler wheel 138, as described above, which in turn adjusts the tension of the drivable track 144 engaged with the idler wheel 138.

It should be appreciated that the planetary screw drive 206 is one example of a suitable arrangement for the actuator 146, yet this disclosure contemplates any actuator having an electric motor capable of receiving electrical current and outputting mechanical energy used to extend and retract the actuator.

The work machine 100 further includes a controller 180 operatively coupled to the electric motor 202. As described above, the controller 180 is configured to control the electrical current input to the electric motor 202 and the direction of rotation of the output shaft 204 of the electric motor 202. The controller 180 may include a memory and a processor configured to execute instructions stored on the memory. The controller 180 may be a single controller or a plurality of controllers operatively coupled to each other. The controller 180 may be hardwired or connected wirelessly to other components of the electrohydraulic system via Wi-Fi, Bluetooth, or other known means of wireless communication. The controller 180 may be housed by the work machine 100 or positioned remotely, away from the work machine 100.

The controller 180 is configured to determine a torque output of the electric motor 202 based on the electrical signals input to the electric motor 202. For example, values of the torque output of the electric motor 202 and corresponding values of current input to the electric motor 202 (for each direction of rotation of the output shaft 204) may be stored in the memory of the controller 180. The stored values may take the form of current-to-torque look-up tables for the electric motor 202. In some embodiments, it may be advantageous to monitor torque output of electric motor 202, rather than electrical current input, because factors in addition to electrical current (for example, friction and direction of rotation) may influence the torque output of the electric motor 202. Still, this disclosure also contemplates embodiments, in which the controller 180 commands and monitors only the electrical current input to the electric motor 202. In any event, the controller 180 is configured to determine the actual tension of the drivable track 130 based on the torque output of the electric motor 202 or based on the electrical current input to the electric motor 202.

The controller 180 is also configured to automatically control electrical signals input to the electric motor 202 to move the linear actuator 146, and therefore, automatically adjust an actual tension of the drivable track 144, based on one or more monitored control factors associated with the work machine 100, examples of which will be described in greater detail below.

In some embodiments, the controller 180 actively commands the electric motor 202 to move the linear actuator 146 to adjust an actual tension of the drivable track 144 based on one or more monitored control factors associated with the work machine 100. What is meant by "actively" is continuously and automatically. In other embodiments, the controller 180 commands the electric motor 202 to move the linear actuator 146 to adjust the actual tension of the drivable track 144 based on the control factors, yet the controller 180 does so only at certain intervals or only in response to one or more monitored control factors (i.e. automatically, but not continuously).

Figure 3:
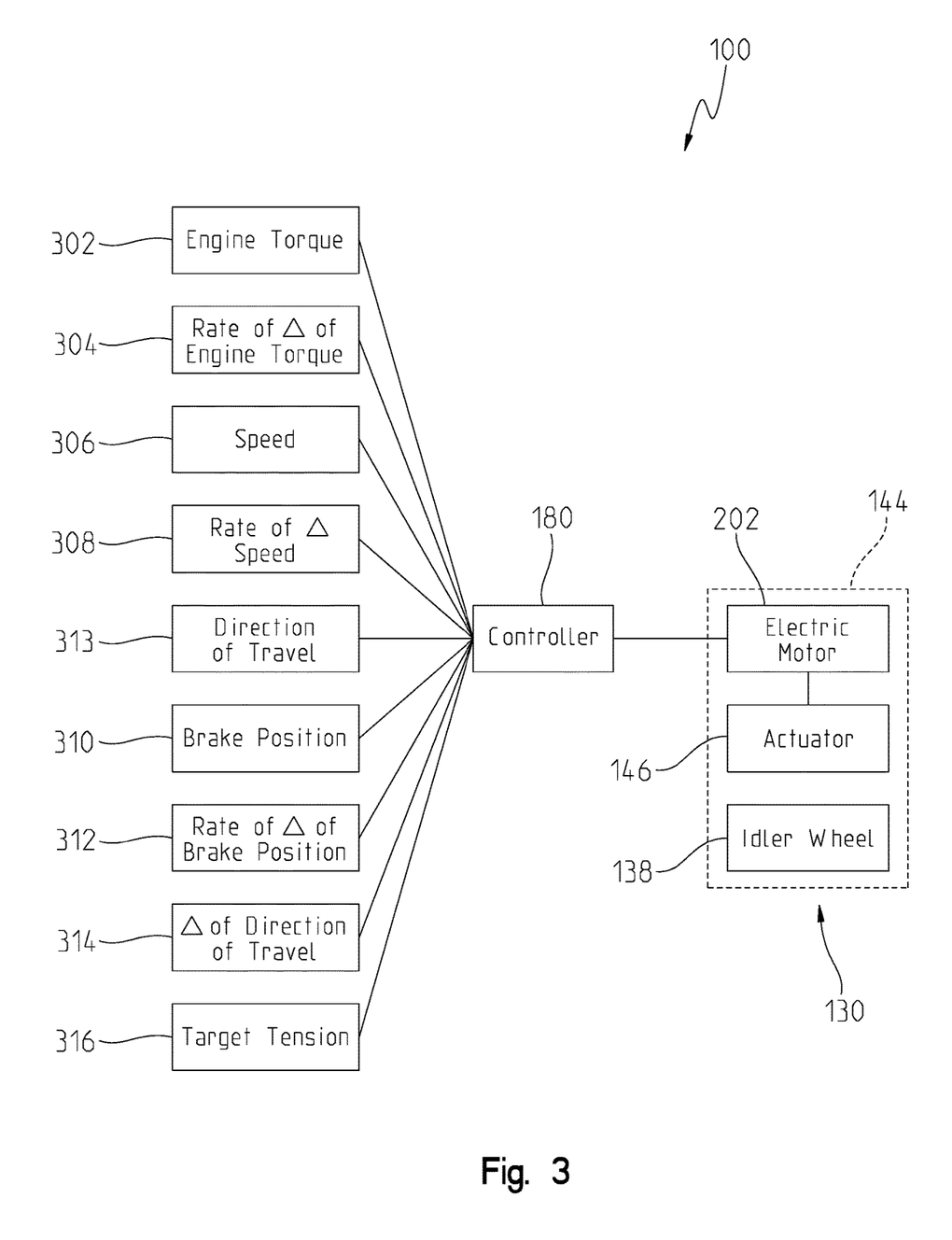
FIG. 3 illustrates a diagrammatic view of the work machine, showing monitorable control factors based on which the controller automatically adjusts electrical signals input to an electric motor powering the linear actuator.

As suggested in FIG. 3, the control factors include, by non-limiting example: (i) a torque output of the engine of the work machine 302, (ii) a rate of change of the torque output of the engine 304, (iii) a speed of the work machine 306, (iv) a rate of change of the speed of the work machine 308, (v) a position of a brake pedal of the work machine 310, (vi) a rate of change the position of the brake pedal 312, (vii) a direction of travel of the work machine 313, (viii) a change in the direction of travel of the work machine 314, and (viii) a target tension of the elastomeric drivable track 316. Examples of the control factors and their respective effects on the system and method of track tension management are described in greater detail below.

The controller 180 may be coupled to an engine control unit (ECU) or sensors associated with the engine 120 to receive signals indicative of the torque output of the engine 120. The torque output of the engine 120 may increase or decrease and may do so at various rates. For example, when the work machine 100 is traveling uphill or rapidly accelerating, torque output of the engine 120 may increase, and when the work machine 100 is traveling downhill or rapidly decelerating, torque output of the engine 120 may decrease. Thus, the controller 180 is configured to monitor or receive signals indicative of the torque output of the engine 304 (see FIG. 3) and extend or retract the actuator 146 based on the torque output of the engine 302. Similarly, the controller 180 is configured to monitor or receive signals indicative of the rate of change of the torque output of the engine 304 and extend or retract the actuator 146 based on the rate of change of the torque output of the engine 304. The controller 180 is further configured to command the actuator 146 to remain in a fixed the position based on the torque output of the engine 302 or the rate of change of the torque output of the engine 304.

In some embodiments, the controller 180 is configured to monitor or receive signals indicative of the speed of the work machine 306 and/or the rate of change of the speed of the work machine 308. The controller 180 is configured to extend or retract the actuator 146 based on the speed of the work machine 306 and/or the rate of change of the speed of the work machine 308. The controller 180 is further configured to command the actuator 146 to remain in a fixed the position based on the speed of the work machine 306 and/or the rate of change of the speed of the work machine 308. The speed of the work machine 100 may be a speed of forward movement, rearward movement, or movement in any other direction of travel.

The work machine 100 may include a brake mechanism, which is for example, operable by use of a brake pedal positioned in the operator's cab 110. The brake pedal may be a compressible brake pedal biased toward a fully raised position and movable (i.e. compressible) to a fully depressed position. The controller 180 is configured to monitor or receive signals indicative of the position of the brake pedal 310 or the rate of change of the position of the brake pedal 312. The controller 180 is configured to extend or retract the actuator 146 based on the position of the brake pedal 310 or the rate of change of the position of the brake pedal 312. The controller 180 is further configured to command the actuator 146 to remain in a fixed the position based on the position of the brake pedal 310 or the rate of change of the position of the brake pedal 312.

In some embodiments, as suggested above, the controller 180 is configured determine or receive a signal indicating a rate of change (e.g., reduction) in speed 308 and/or the rate of change of the position of the brake pedal 310. The controller 180 is configured to compare the rate of reduction in speed to a threshold rate of reduction in speed of the work machine 100. Additionally, or alternatively, controller 180 is configured to compare the rate of change of the position of the brake pedal to a threshold the rate of change of the position of the brake pedal. In response to determining that at least one of the rate of reduction in speed and the rate of change of the position of the brake pedal exceeds its corresponding threshold, the controller 180 is configured to send signals to the electric motor to extend or fix the position of the linear actuator 146.

The occurrence of: (a) the rate of reduction in speed 308 exceeding a threshold rate of reduction in speed of the work machine 100 or (b) the rate of change of the position of the brake pedal 312 exceeding a threshold rate of change of the position of the brake pedal may be referred to as a panic braking event. During a panic braking event, drivable tracks of conventional work machines have a tendency to bunch or separate from the drive sprocket. In the embodiment described here, the controller 180 commands the linear actuator 146 to extend or remain fixed in its position in response to detecting a panic braking event in order to counteract the tendency of the drivable track 144 to bunch or separate from the drive sprocket 136.

In some embodiments, the controller 180 is configured to monitor or receive signals indicative of the direction of travel 313 and/or a change in the direction of travel 314 of the work machine. The controller 180 is configured to extend or retract the actuator 146 based on the direction of travel 313 and/or a change in the direction of travel 314 of the work machine. In some embodiments, a signal indicative of a change in the direction of travel may be used to initiate the tension adjustment of the drivable track 144. For example, the controller 180 may send a signal to adjust the drivable track 144 when the work machine 100 is moved between forward and neutral operating conditions or between neutral and reverse operating conditions.

Referring still to FIG. 3, the controller 180 is configured to receive a signal associated with a target tension 316 of the drivable track 144. The target tension 316 may be input by a user via an operator control, or the target tension 316 may be a nominal tension value associated with the drive assembly 130 of the work machine 100. What is meant by "nominal tension" is a desired tension value suitable for the anticipated operations of the work machine 100 for the particular drivable track 144.

In any case, the controller is configured to actively compare the actual tension of the drivable track 130 to the target tension (e.g., nominal tension) of the drivable track 130. If the controller 180 determines that the actual tension is beyond a threshold difference from the target tension 316, the controller 180 commands the electric motor 202 to move the linear actuator 146 so that the actual tension is adjusted toward the target tension 316.

In use, the controller 180 actively determines the actual tension of the drivable track 144 based on the torque output of the electric motor 202 or the electrical current input to the electric motor 202. In an iterative process, the controller 180 then compares the actual tension of the drivable track 144 to the target tension 316 of the drivable track 144. As described above, if the actual tension is beyond a threshold difference from the target tension 316, the controller 180 adjusts the actual tension toward the target tension 316.

In some embodiments, is the controller is configured to send signals to the electric motor 202 to retract the linear actuator 146 to its fully retracted position and subsequently extend the linear actuator 146 to a position associated with the target tension 316. This operation may be performed based on any one of the control factors 302-314. For example, this operation may be performed (based on control factor 314) when the work machine 100 is moved between forward and neutral operating conditions or between neutral and reverse operating conditions.

Further, the retraction-to-extension operation described above may be performed as calibration process for the linear actuator 146. For example, as the linear actuator 146 is extended from its fully retracted position, the controller 180 may monitor: (i) the electrical current input to the electric motor 202 and/or the torque output of the electric motor 202, (ii) direction of rotation of the output shaft 204, and (iii) the tension of the drivable track 144 to identify parameters of the electric motor 202 associated with the nominal tension of the drivable track 144.

After the nominal tension is identified, the nominal tension may be adjusted based on user input or based on other monitored control factors. Thus, the other control factors 302-314 may be used to actively adjust target tension 316 away from its nominal (i.e. calibrated) value. As described above, the controller 180 actively determines the actual tension of the drivable track 144, and the controller 180 compares the actual tension of the drivable track 144 to the (now-adjusted) target tension 316 of the drivable track 144. If the actual tension is beyond a threshold difference from the target tension 316, the controller 180 commands the electrical motor 180 to adjust the actual tension toward the target tension 316.

Figure 4:
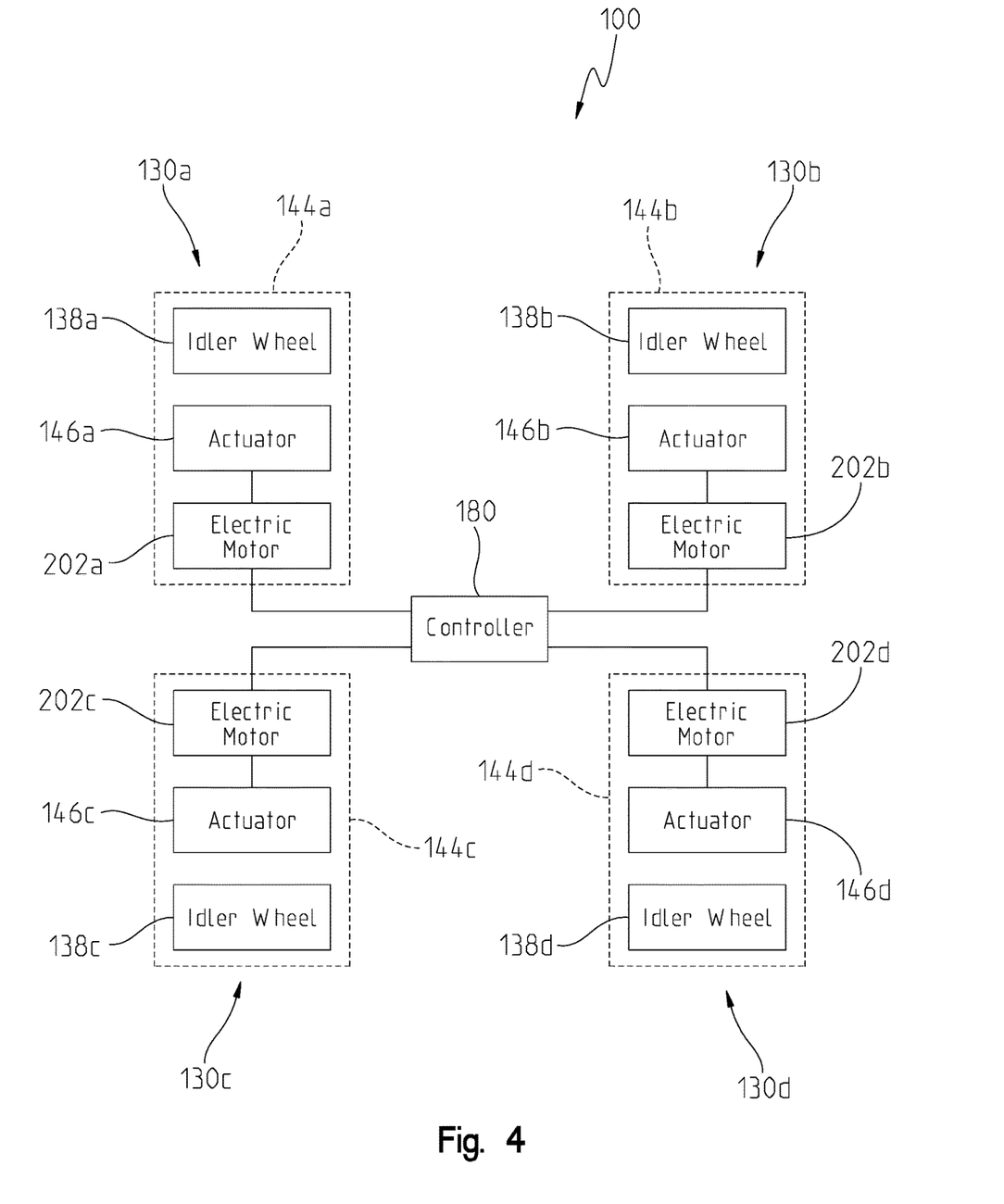
FIG. 4 illustrates a diagrammatic view of the control system for the work machine, showing that the controller may independently control electric signals input to different electric motors associated with each drivable track of the work machine.

Referring now to FIG. 4, the work machine 100 may include a forward pair of drive assemblies 130a, 130b and a rearward pair of drive assemblies 130c, 130d. The drive assemblies 130a-d include, respectively, the electric motors 202a-d, the electrically powered linear actuators 146a-d, the idler wheels 138a-d, and the drivable tracks 144a-d. As suggested above, the tension in each drivable track 144a-d is adjustable by movement (extension or retraction) of the corresponding linear actuators 146a-d. As shown in FIG. 4, each electric motor 202a-d is independently, electrically coupled to the controller 180. Thus, the controller 180 is configured to send different electrical signals to each electric motor 202a-d. Therefore, the controller 180 is configured to adjust each linear actuator 146a-d independently from every other linear actuator 146a-d.

It should be appreciated that, as described above, the controller 180 is configured to adjust (i.e. extend, retract, or fix) each linear actuator 146a-d based on at least one of the control factors 302-316.

In some embodiments, the controller 180 is configured to adjust the linear actuators 146a-b associated with the forward pair of drivable tracks 144a-b independently of the linear actuators 146c-d associated with the rearward pair of drivable tracks 144c-d, or visa-versa, based on the at least one monitored control factor 302-316.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A work machine comprising:
   a drive assembly including:
      an electric motor;
      an idler wheel;
      a drivable track engaged with the idler wheel; and
      a linear actuator driven by the electric motor, coupled to the idler wheel, and movable through a range of positions, wherein each position of the linear actuator is associated with a different tension of the drivable track; and
   a brake pedal movable through a range of positions including a fully raised position and a fully depressed position; and
   a controller configured to determine at least one of a torque output or current input for the electric motor and configured to determine the actual tension of the drivable track based on the at least one of the torque output or current input of the electric motor;
   wherein the controller is configured to monitor a rate of position change of the brake pedal; and
   wherein the controller commands the electric motor to move the linear actuator to adjust the actual tension of the drivable track if the rate of position change of the brake pedal exceeds a threshold rate of position change.

2. The work machine of claim 1, wherein the drivable track is an elastomeric material.

3. The work machine of claim 1, wherein the controller is configured to identify a target tension of the drivable track; and
   wherein the controller is configured to command the electric motor to move the linear actuator if the actual tension is beyond a threshold difference from the target tension.

4. A work machine comprising:
   a drive assembly including:
      an electric motor;
      an idler wheel;
      a drivable track engaged with the idler wheel; and
      a linear actuator driven by the electric motor, coupled to the idler wheel, and movable through a range of positions, wherein each position of the linear actuator is associated with a different tension of the drivable track; and
   a controller configured to send signals to the electric motor to extend the linear actuator when a rate of reduction in speed exceeds a threshold rate of reduction in speed of the work machine.

5. The work machine of claim 4, wherein the drivable track is an elastomeric material.

6. The work machine of claim 4, wherein the controller is configured to identify a target tension of the drivable track;
wherein the controller is configured to command the electric motor to move the linear actuator if an actual tension is beyond a threshold difference from the target tension; and
wherein the controller is configured to identify at least one of a torque output or current input for the electric motor and configured to determine the actual tension of the drivable track based on the at least one of the torque output or current input of the electric motor.

7. A work machine comprising:
a drive assembly including:
an electric motor;
an idler wheel;
a drivable track engaged with the idler wheel; and
a linear actuator driven by the electric motor, coupled to the idler wheel, and movable through a range of positions, wherein each position of the linear actuator is associated with a different tension of the drivable track; and
a controller configured to determine at least one of a torque output or current input for the electric motor and configured to determine the actual tension of the drivable track based on the at least one of the torque output or current input of the electric motor;
wherein the controller is configured to retract the linear actuator and subsequently extend the linear actuator to a position associated with a target tension in response to a change in operating conditions of the work machine between at least one of: (i) a forward operating condition or a reverse operating condition, and (ii) a neutral operating condition.

8. The work machine of claim 7, wherein the drivable track is an elastomeric material.

9. The work machine of claim 7, wherein the controller is configured to command the electric motor to move the linear actuator if the actual tension is beyond a threshold difference from the target tension.

10. A method of operating a work machine having an elastomeric drivable track comprising:
determining at least one of a torque output or current input for an electric motor configured to drive a linear actuator;
determining an actual tension of the elastomeric drivable track based on the at least one of the torque output or current input of the electric motor;
measuring
a torque output of an engine of the work machine and
a rate of change of the torque output of the engine; and
adjusting the current input to adjust the actual tension of the elastomeric drivable track based on the measured torque output of the engine of the work machine and the measured rate of change of the torque output of the engine.

11. The method of claim 10, wherein adjusting the actual tension of the elastomeric drivable track includes:
adjusting current input to the electric motor to move the linear actuator, which is coupled to an idler wheel that is engaged with the elastomeric drivable track.

12. A method of operating a work machine having an elastomeric drivable track comprising:
determining at least one of a torque output or current input for an electric motor configured to drive a linear actuator;
determining an actual tension of the elastomeric drivable track based on the at least one of the torque output or current input of the electric motor;
measuring
a rate of change of a position of a brake pedal of the work machine; and
adjusting the current input to adjust the actual tension of the elastomeric drivable track if the measured rate of change of the position of the brake pedal of the work machine exceeds a threshold rate of position change.

13. The method of claim 12, wherein adjusting the actual tension of the elastomeric drivable track includes:
adjusting current input to the electric motor to move the linear actuator, which is coupled to an idler wheel that is engaged with the elastomeric drivable track.

14. A method of operating a work machine having an elastomeric drivable track comprising:
determining at least one of a torque output or current input for an electric motor configured to drive a linear actuator;
determining an actual tension of the elastomeric drivable track based on the at least one of the torque output or current input of the electric motor;
determining a change in operating conditions of the work machine between at least one of: (i) a forward operating condition or a reverse operating condition, and (ii) a neutral operating condition; and
adjusting the linear actuator, which is coupled to an idler wheel engaged with the elastomeric drivable track, in response to determining the change in operating conditions of the work machine to adjust the actual tension of the elastomeric drivable track.

15. The method of claim 14, further comprising adjusting the linear actuator again to a position associated with a target tension of the elastomeric drivable track subsequent to adjusting the linear actuator in response to determining the change in operating conditions of the work machine.

16. The method of claim 14, wherein determining a change in operating conditions of the work machine between at least one of: (i) a forward operating condition or a reverse operating condition, and (ii) a neutral operating condition includes: determining a change from the forward operating condition to the neutral operating condition; and
wherein adjusting the linear actuator in response to determining the change in operating conditions of the work machine includes: adjusting the linear actuator in response to determining the change from the forward operating condition to the neutral operating condition.

17. The method of claim 14, wherein determining a change in operating conditions of the work machine between at least one of: (i) a forward operating condition or a reverse operating condition, and (ii) a neutral operating condition includes: determining a change from the reverse operating condition to the neutral operating condition; and
wherein adjusting the linear actuator in response to determining the change in operating conditions of the work machine includes: adjusting the linear actuator in response to determining the change from the reverse operating condition to the neutral operating condition.

18. The method of claim 14, wherein determining a change in operating conditions of the work machine between at least one of: (i) a forward operating condition or a reverse operating condition, and (ii) a neutral operating condition includes: determining a change from the neutral operating condition to the forward operating condition; and
wherein adjusting the linear actuator in response to determining the change in operating conditions of the work machine includes: adjusting the linear actuator in response to determining the change from the neutral operating condition to the forward operating condition.

19. The method of claim 14, wherein determining a change in operating conditions of the work machine between at least one of: (i) a forward operating condition or a reverse operating condition, and (ii) a neutral operating condition includes: determining a change from the neutral operating condition to the reverse operating condition; and
 wherein adjusting the linear actuator in response to determining the change in operating conditions of the work machine includes: adjusting the linear actuator in response to determining the change from the neutral operating condition to the reverse operating condition.

20. A work machine comprising:
 a drive assembly including:
  an electric motor;
  an idler wheel;
  a drivable track engaged with the idler wheel; and
  a linear actuator driven by the electric motor, coupled to the idler wheel, and movable through a range of positions, wherein each position of the linear actuator is associated with a different tension of the drivable track;
 an engine mechanically coupled to the drivable track and configured to drive rotation of the drivable track; and
 a controller configured to determine at least one of a torque output or current input for the electric motor and configured to determine the actual tension of the drivable track based on the at least one of the torque output or current input of the electric motor;
 wherein the controller is configured to send signals to the electric motor to move the linear actuator based on a torque output of the engine to adjust the actual tension of the drivable track; and
 wherein the controller is configured to send signals to the electric motor to move the linear actuator based on a rate of change of the torque output of the engine to adjust the actual tension of the drivable track.

21. The work machine of claim 20, wherein the drivable track is an elastomeric material.

22. The work machine of claim 20, wherein the controller is configured to identify a target tension of the drivable track; and
 wherein the controller is configured to command the electric motor to move the linear actuator if the actual tension is beyond a threshold difference from the target tension.

* * * * *